United States Patent [19]
Hsieh

[11] Patent Number: 5,838,461
[45] Date of Patent: Nov. 17, 1998

[54] FAX MAIL AUTOMATIC DISTRIBUTION SYSTEM

[75] Inventor: Chen Yun Hsieh, Hsin Chu, Taiwan

[73] Assignee: Taiwan Semiconductor Manufacturing Company, Ltd., Hsin-Chu, Taiwan

[21] Appl. No.: 665,332

[22] Filed: Jun. 17, 1996

[51] Int. Cl.⁶ ................................................. H04N 1/32
[52] U.S. Cl. ..................... 358/442; 358/402; 358/440; 379/93.24; 379/100.01
[58] Field of Search ............................ 358/400, 434, 358/435, 436, 442, 444, 402, 403, 404, 440; 379/100, 93, 90, 100.01, 100.12, 100.14, 100.16, 106.01, 80, 82, 84, 89, 93.24

[56] References Cited

U.S. PATENT DOCUMENTS

| | | | |
|---|---|---|---|
| 5,072,309 | 12/1991 | Brown | 358/434 |
| 5,115,326 | 5/1992 | Burgess et al. | 358/440 |
| 5,127,047 | 6/1992 | Bell et al. | 379/100 |
| 5,206,743 | 4/1993 | Hochman | 358/440 |
| 5,235,433 | 8/1993 | Clarkson et al. | 358/434 |
| 5,339,156 | 8/1994 | Ishii | 358/400 |
| 5,384,835 | 1/1995 | Wheeler et al. | 358/442 |
| 5,404,231 | 4/1995 | Bloomfield | 358/400 |
| 5,461,488 | 10/1995 | Witek | 358/402 |
| 5,513,126 | 4/1996 | Harkins et al. | 358/402 |
| 5,629,981 | 5/1997 | Nerlikar | 380/25 |
| 5,668,855 | 9/1997 | Misholi et al. | 358/403 |
| 5,771,354 | 6/1998 | Crawford | 395/200.59 |

*Primary Examiner*—Edward L. Coles
*Assistant Examiner*—Madeline Av Nguyen
*Attorney, Agent, or Firm*—George O. Saile; Stephen B. Ackerman

[57] ABSTRACT

This invention relates to the automatic receipt and distristribution of facsimile mail, herein known as fax mail. It is particularly important in situations where there is a relatively large number fax users and relatively few fax machines to perform the sending and receiving. In this case the manual distribution is cumbersome and slow, and provides little tracking or security. This invention provides a fairly simple method to automatically distribute fax mail to a number of recipient that are network connected to a server or main computer. At the same time the method provides a means for handling fax mail that does not have with it the routing information necessary to automatically route it to the intended recipient. The process also has means to provide tracking and security for auditing purposes.

14 Claims, 3 Drawing Sheets

FAX MAIL AUTOMATIC DISTRIBUTION SYSTEM

BACKGROUND OF THE INVENTION

1. Field of Invention

This invention relates to systems for distribution of information, and more particularly to the automatic receipt and distribution of facsimile mail, herein known as fax mail.

2. Description of Related Art

The usage of fax mail has become quite popular and provides a convenience for the sender and receiver to be able to share an image as it exists with the sender. Some of these images are facsimiles of straight forward text and could be transmitted easily by other means like E-mail, but getting text into a digital form is not always convenient. Other images contain graphics, or non-text; and although, there are ways to transmit these graphics through an E-mail system, it is also not convenient. It would require senders and receivers to perform the likes of encoding and decoding or be connected to the same E-mail system to be able to attach files to messages. Fax-mail spans all these and provides the convenience of being able to recreate within moments a facsimile of an image at a receiving fax machine which exists at the sending fax machine located miles apart.

As the facsimile technology has become more popular, more and more people are receivers and senders of fax data. To save on cost in some establishments, a few fax machines have been assigned to many people and the problem of distributing the fax mail to all the people became burdensome and slow. The tracking of the fax mail became difficult and security was compromised with more people having access to the manual system. Different schemes have been created to help in this distribution. One scheme, as disclosed in U.S. Pat. No. 5,115,326 (Burgess, et al.), includes the use of a bar code on the first page of the fax mail containing such information as the "To", "From" and "Subject". This allows the computing system to which the fax mail is connected to read the bar code and determining key routing information. The difficulty with this scheme is that everyone sending a fax to this system needs a bar code encoder for their fax to be handled automatically by the system. A second scheme, as disclosed in U.S. Pat. No. 5,461,488 (Witek), an automatic fax system is described in which an incoming fax is automatically converted to a text file using some form of character recognition and then sent to the receiving individual by means of an electronic mail system. This automatic system is greatly dependent on the quality of the character recognition as well as the quality of the incoming data. Other schemes include creating an elaborate indexing, storage and retrieval system, as disclosed in U.S. Pat. No. 5,235,433 (Clarkson, et al.), to be able to handle a large volume of fax mail. This scheme incorporates telephony data that comes with the transmission of the fax. The difficulty here is that it relies on a correlation between the sender and the sending phone numbers. In today's world of portable PC's this can be a difficulty. Still another scheme links E-mail and fax mail systems, as disclosed in U.S. Pat. No. 5,339,156 (Ishii), have been created that use the E-mail system for notification and control and the fax mail system for storage and delivery including delivery of data from the E-mail system.

Through all of this there is a continuing need for a simple system that handles most fax mail automatically, delivering it to the receivers mail box while permitting fax mail not adhering to all the requirements to have a convenient method for routing to the receiver of the fax mail. Also there needs to be included in such a system the methodology and capability to send, track and maintain security on the fax mail.

SUMMARY OF THE INVENTION

The need to automate the distribution of fax mail arises from the number of pieces of fax mail and the number of recipients using a single fax machine. Not only is the manual distribution tedious and cumbersome but provides little tracking and security capability. An automatic system lends itself to providing both a tracking system as well security.

In this invention a main computing system or server is connected to a multiple of personal computers, or PC's, through a network. Everyone who shares the system has an unique electronic mail box. The address of the mail box is mapped to the unique ID number of the owner. Everyone can receive messages and data at a local PC from their respective mail box. Also connected to the server is a data and voice modem herein called a modem and having the capability to transmit facsimile, or fax, data as well as voice information. The sender of a fax dials the phone number of the telephone line connected to the modem using the sending fax phone. Upon detection that the modem is being called, a voice response is sent to the sender of the fax through the modem asking for a destination ID of the person who is to receive the fax. The sender enters the destination ID on the fax phone key pad. After entering all destination ID's the sender is asked by the server to start the fax transmission. Having received the fax data, the server routes the fax to the personal mail box corresponding to the destination ID's provided by the sender. In the process the fax is placed in the receiving message audit pool in the server for audit purposes.

Should the sender not know the destination ID of the receiving person, the fax is placed into a message pool. The fax operator reviews the fax having no destination ID and determines the destination from a list of possible receiving persons. If the operator can't determine the destination, he (she) posts a message in a bulletin mail box for the intended receiver of the fax. The receiver reviews the bulletin mail box and can ask for full details from the message pool. The server then requests that the receiver send a destination ID to the fax sender. If the operator can determine who should receive the fax, the operator sends the fax to the personal mail box of the receiver through the server and the network. The receiver reads the fax from his (her) personal mail box by accessing it with a local PC.

A fax being sent from the system is prepared for sending at a local PC using a network copy of the software fax resident in the server. When the fax data is ready for sending to a remote fax machine, the sender at the local PC sends the fax through the router to the modem attached to the server. The router saves a copy of the fax in the sending message audit pool for audit purposes and places a privilege level on the information defining who may look at the data.

BRIEF DESCRIPTION OF THE DRAWINGS

This invention will be described with reference to the accompanying drawings, wherein.

DETAILED DESCRIPTION OF THE PREFERRED EMBODIMENT

Figure 1:
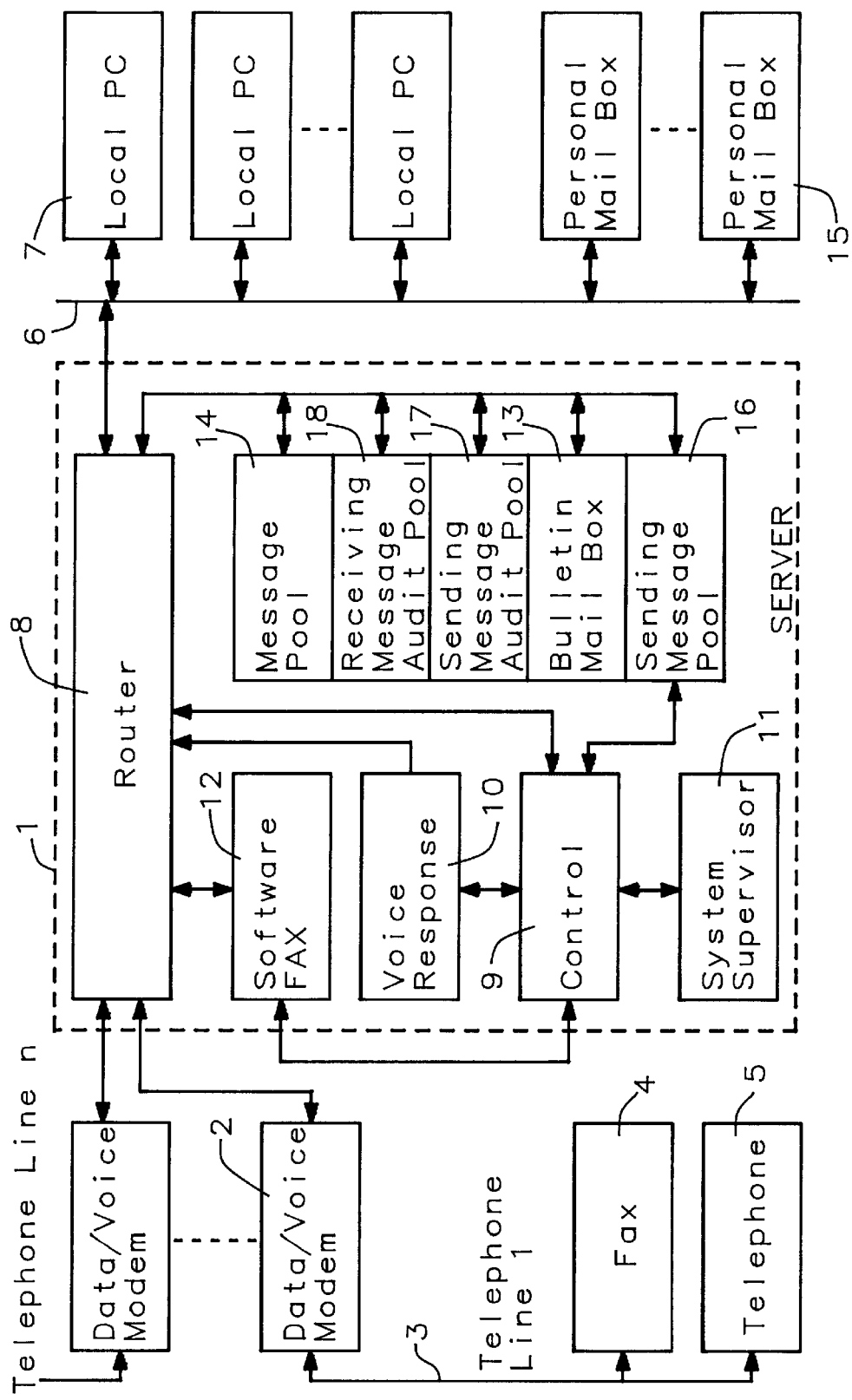
FIG. 1 is a block diagram of the system configuration according to the invention.

Referring to FIG. 1, a main computing system or server 1 is connected to a data and voice modem 2 and through a telephone line 3 to a remote fax machine 4. The remote fax machine 4 is connected with an integrated, or separate, telephone 5 to the telephone line 3 and having touch tone capability. The server is further connected to a network 6 and through this network to a number of local personal computers, or PC's 7, and personal mail boxes 15.

Continuing to refer to FIG. 1, the server 1 is configured amongst other computing functions for handling the receiving and sending of fax data, and having a router function 8 that interfaces the elements of the system and controls the flow of information between those elements. When the data-voice modem 2 is called by a sending fax machine 4, the call is detected by the router 8. The router 8 request through a control unit 9 for a voice response be sent to the sender at the remote fax 4. The control unit 9 signals the voice response module 10 to send a voice message to the sender at the remote fax 4 requesting that a destination ID for a receiving person be keyed into the key pad of the phone 5. The control unit 9 is further connected to the system supervisor 11 to insure adequate system resources are available to receive the incoming fax message. After the entry of each destination ID by the sender at the remote fax phone 5, the router 8 requests the voice response 10 through the control unit 9 to ask if there are any more destination ID's, and if there are none to enter the "#"sign into the key pad of the fax phone 5. Upon receiving the signal representing the "#"through the modem 2, the router 8 requests the voice response 10 to request the fax sender to start the transmission of the fax data from the remote fax machine 4. The router 8 connects the incoming fax data from the modem 2 to the software fax 12. The software fax 12 interprets the incoming fax data from the modem 2 and formats the data to be transmitted to the mail box 15 of the person having the destination ID sent by the sender at the remote fax machine 4. The router 8 sends the formatted data from the software fax 12 through the network 6 to the personal mail box 15, and copies the detail of the fax into a receiving message audit pool 18 for auditing purposes. If there were no destination ID's provided by the sender at the remote fax machine 4, the fax data formatted by the software fax 12 is sent to a message pool 14 by the router 8 for review to determine the destination ID.

Figure 2:
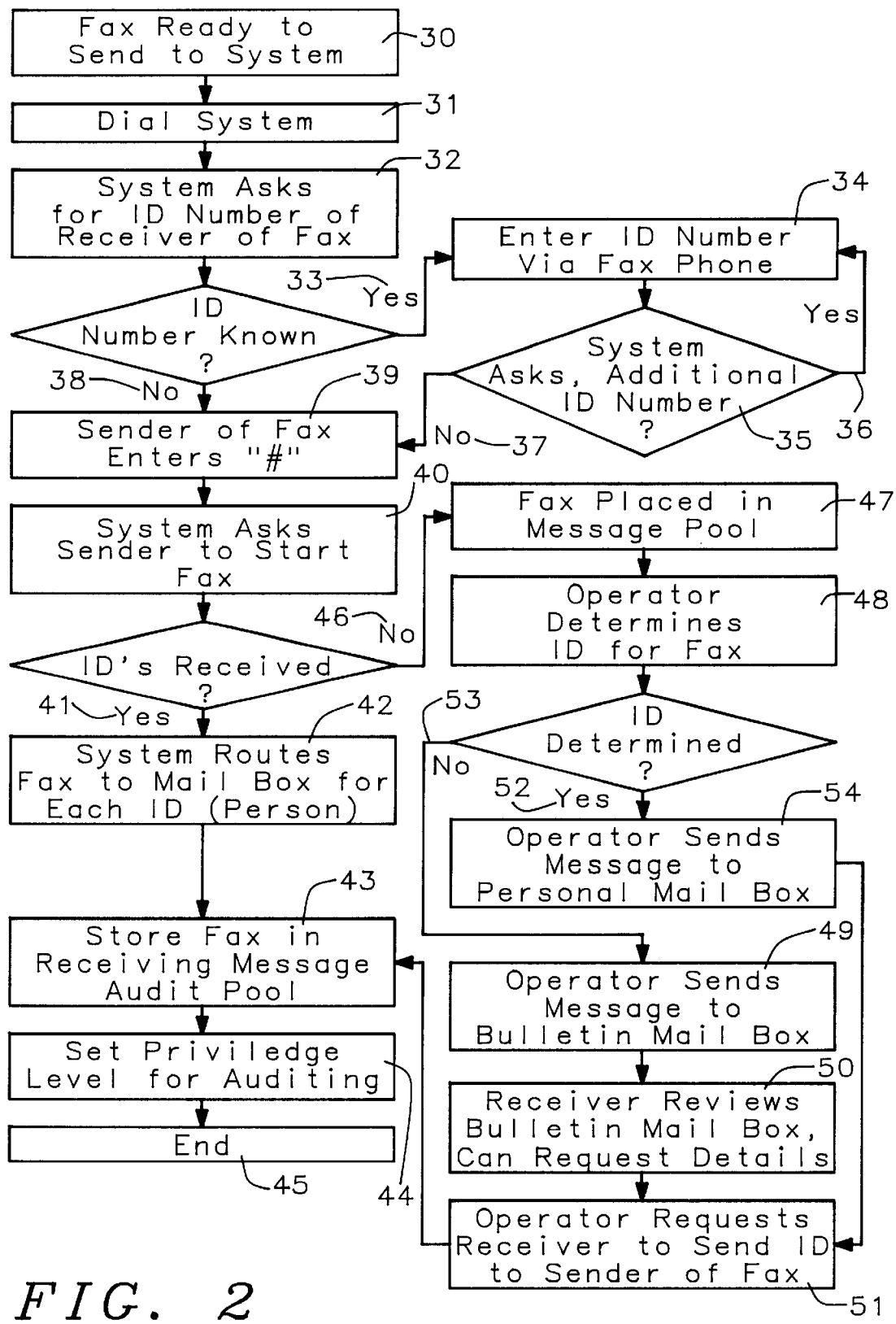
FIG. 2 is the flow diagram for receiving fax data according to the invention.

Referring to FIG. 2 a flow diagram is shown for the process of receiving fax mail from a remote fax machine 4 shown in FIG. 1. A fax is prepared to send to the system 30. The sender dials the system 31 to which the fax is to be sent. Upon receiving the phone call from the sender at the remote fax, the system sends a voice message asking for the destination ID number of the receiver of the fax 32. If the ID number is known 33, the sender enters the ID number using the fax phone key pad 34. After the entry of each ID number, the system asks by voice means for an additional ID number 35. If there are additional ID numbers 36, the sender enters each one after being prompted by voice by the system each time with a request for additional; ID numbers 35. If there are no additional ID numbers 37 or there was none with which to begin 38, the fax sender enters the "#"symbol 39 on the fax machines phone key pad as prompted by voice by the system. After receiving the "#"signal, the system asks the sender by means of a voice response to start transmission of the fax 40. If destination ID's 34 were received by the system, the fax is routed to the mail box of each ID that was provided 42. The copy of the fax is stored in the receiving message audit pool 43 for tracking and audit purposes. A privilege level is set to establish who may review the fax for security purposes 44. If there were no receiver destination ID's 46, the fax is placed into a message pool 47. The operator reviews the fax and determines an destination ID 48. If the operator can determine who should receive the fax 52, the fax is sent to the personal mail box 54 of the person who should receive the fax. If the receiving person cannot be determined 53, the operator then sends a message to the bulletin mail box 49. A receiving person reviews the bulletin mail box 50 for any fax not having a destination ID using a local PC 7. Any fax intended for the person but not routed to the personal mail box can be requested from the message pool. The operator requests the receiver to send the destination ID to the sender of the fax 51. The fax is stored in a receiving message audit pool 43 and a privilege level is set for auditing purposes 44.

Figure 3:
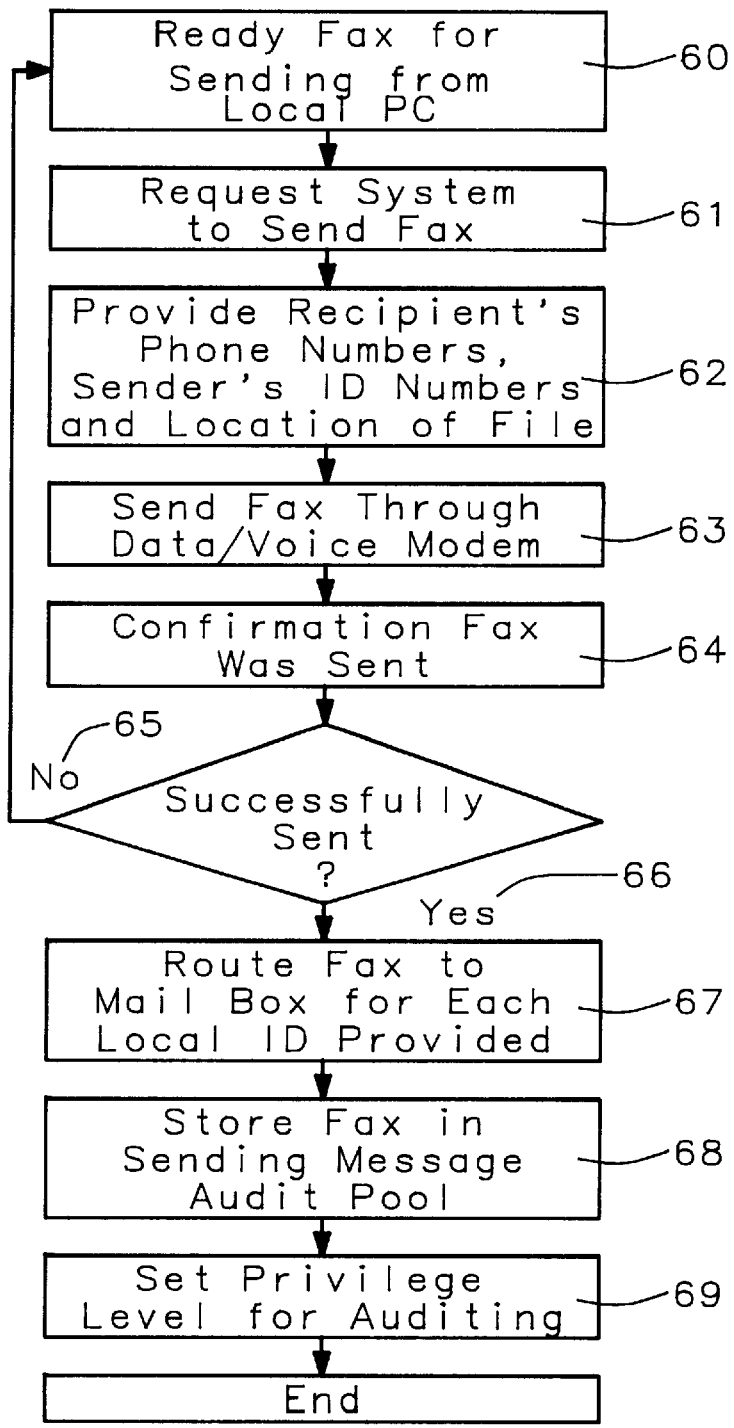
FIG. 3 is the flow diagram for sending fax data according to the invention.

Referring to FIG. 3, a process for sending fax data to a remote fax machine is shown. A fax is readied at a local PC 7 in FIG. 1 for sending 60 and a request is made of the system to send the fax 61. Destination ID's in the form of telephone numbers for remote fax machines and ID number of the sender along with the location of the fax file 62 are provided to the system for sending the fax. The fax is sent through the data-voice modem to each phone number provided 63. The system confirms that the fax was successfully sent 64. If the fax was not successfully sent 65, the fax is returned to the local PC sender for modifications and a retry 60. If the fax was successfully sent 66 to the remote fax machine, the fax is routed to the mail box of each person whose ID was provided as a destination ID 67. Similar to the process for receiving fax data, a copy of the fax data is stored into the sending message audit pool for auditing 68 and a privilege level is set for auditing purposes 69.

While the invention has been particularly shown and described with reference to preferred embodiments thereof, it will be understood by those skilled in the art that various changes in form and details may be made without departing from the spirit and scope of the invention.

What is claimed is:

1. A fax mail automatic distribution system, comprising:
   (a) data and voice modems connected between telephone lines and a computer server,
   (b) said telephone lines connected to a telephone system and through this connection to remote fax machines,
   (c) said remote fax machines having voice phone capability which may be a separate touch tone phone connected to the same telephone line,
   (d) said voice phone capability of the remote fax machine to receive voice commands from said server requesting fax sender to enter destination identification numbers of fax receivers, to end of said destination identification numbers with a "#" sign and to start transmission of fax,
   (e) said server further connected to a network of local PC's,
   (f) each local PC having capability to send and receive messages and data to and from the server and other PC's,
   (g) a unique personal mail box mapped to each unique individual personal ID number for receiving messages and data,
   (h) fax data being sent from remote fax machine is connected to a software fax for interpretation with the output of said software fax being routed by the server to a receiving mail box with the address mapped to the personal ID of a fax receiver as provided with the fax and to a receiving message audit pool.
   (i) said fax data sent to said receiving message audit pool having a privilege level set to control audits for security purposes.

2. The fax mail automatic distribution system of claim 1 wherein a fax is sent from the server to said remote fax machine and comprising:
  (a) a fax originating in one of the local PC's and connected to said server by means of said network,
  (b) said server connecting said fax to a sending message audit pool, setting an audit privilege and further connecting said fax to said modems which in turn are connected to said telephone lines,
  (c) said fax comprising of a destination ID, a sending ID and data,
  (d) said sending ID being the ID of an individual sending the fax,
  (e) said destination ID consisting of a telephone number of a receiving fax machine,
  (f) said destination ID used to dial said receiving fax machine by means of said data and voice modem.

3. The fax mail automatic distribution system of claim 2, wherein multiple destination ID's are included for fax data to be sent to multiple fax machines.

4. The fax mail automatic distribution system of claim 2, wherein multiple destination ID's include addresses for personal mail boxes connected to the server by a network and telephone numbers of remote fax machines.

5. A server for automatic routing of fax mail to a network of connected personal mail boxes, and comprising:
  (a) a router to control the routing of messages and fax data between a data and voice modem and a network of personal mail boxes,
  (b) said router having detected an incoming fax, requests a voice response module to send a voice signal to sender of the fax requesting a destination ID number for the receiver of the fax,
  (c) said router detects the destination ID number associated with the fax data and connects the incoming fax data to a software fax to interpret and format the incoming fax data for subsequent usage,
  (d) said router connects an output of the software fax by means of a network to a local personal computer and to a personal mail box corresponding to the destination ID,
  (e) said router copies the detail fax data into a receiving message audit pool to be used as an audit trail and sets an audit privilege for security purposes,
  (f) said router is connected to a control unit and through the control unit to a system supervisor,
  (g) the control and supervisor units controlling operations such as to insure adequate system resources to handle fax data flowing from the remote fax machine to the receiving personal mail box.

6. The server for automatic routing of fax mail of claim 5, wherein no destination ID is received, and comprising:
  (a) said router connects the incoming fax data to the software fax,
  (b) said software fax interprets the incoming data and formats an output data for future usage,
  (c) said router forwards the output of said software fax to a message pool for review by an operator,
  (d) said operator attempts to determine destination of said fax and sends a message to a bulletin mail box when no destination can be determined,
  (e) said fax is routed to a personal mail box when the destination ID can be determined and a copy is placed in a receiving message audit pool with audit privileges set for security purposes,
  (f) a receiving person reviews the bulletin mail box and requests the fax from the message pool when no destination ID is determined,
  (g) The requested fax is copied to the personal mail box of the receiving person and a copy is placed in the receiving message audit pool with audit privileges set for security purposes,
  (h) said operator requests the receiving person to send destination ID to sender of the fax.

7. The server of claim 5, wherein a fax originates from the network of local personal computers, comprising:
  (a) fax data sent to the router from the network of local personal computers and having a telephone number as the destination ID,
  (b) said telephone number is that of a fax machine remote from the system by a telephone line,
  (c) said router connects the fax data to the software fax to prepare the fax data to be sent to a modem,
  (d) said router sends a copy of the detail fax information including source and destination ID's to a sending message audit pool for audit purposes and sets privilege level for auditing,
  (e) said destination ID being sent to a data and voice modem by the router followed by the fax data output of the software fax when a modem to modem connection has been established,
  (f) said router sends a completion confirmation to the sending local personal computer that the fax was successfully sent.

8. A process for automatic distribution of fax mail, and comprising:
  (a) a fax sender using a remote fax machine having touch tone phone capability and connected to a computing system or server by means of a telephone line,
  (b) said server further connected by means of a network to multiple personal mail boxes,
  (c) one or more of the personal mail boxes being a receiver of the fax mail,
  (d) said fax sender readies the fax to be sent and dials the server with the phone at the sending fax machine,
  (e) the server being connected to the phone system through a data and voice modem detects the incoming fax phone call and sends a voice response requesting the fax sender to enter a destination ID,
  (f) said fax sender enters said destination ID on a telephone key pad and the server upon receiving the ID sends a second voice response asking for another destination ID,
  (g) said fax sender enters another destination ID and again is asked by the server for an additional destination ID,
  (h) said fax sender continues to enter destination ID's until there are none left and then enters a "#" sign on the phone key pad to signify the end of destination ID's,
  (i) the server having received the signal representing said "#" sends a voice response requesting the fax sender to start sending the fax,
  (j) said fax sender starts the fax machine to send fax data to the server,
  (k) the server receives the fax and routes it to the personal mail box corresponding to the destination ID,
  (l) the server copies detail fax information, including source phone number and destination ID, into the receiving message audit pool for auditing purposes and sets auditing privilege level.

9. The process in claim 8 wherein no destination ID of a fax receiver is received from said fax sender, and comprising:

(a) the server places fax mail without said destination ID into a message pool, (b) a system operator reviews the message pool and determines a receiver destination ID for any fax found in the message pool, (c) said operator sends a summary message to a bulletin mail box, (d) said receiver at a local PC reviews summary information of fax in the bulletin mail box and reads full details from the fax data stored in the message pool, (e) said operator requests the fax receiver to send destination ID to the fax sender and sets a privilege level for the fax detail information for auditing purposes.

10. The process in claim 9 wherein the fax receiver wants fax data stored in the local PC, and comprising:

(a) a fax receiver reviews fax data in a message pool, (b) said fax receiver determines fax data to reside in a local PC, (c) said fax receiver initiates a move of the data to the local PC, deleting the copy in said message pool.

11. The process of claim 8 wherein the fax sender is a local PC connected to the server and the fax receiver is the fax machine remote by a telephone line, and comprising:

(a) a destination ID being the telephone number of the remote fax machine and the sender ID being one of the personal mail boxes, (b) the sender readies the fax and notifies said server that a fax is ready to be sent, (c) said server requests destination ID's and connects the destination ID's to a data and voice modem to dial the remote fax machine, (d) said server sends fax data to said fax receiver through the modem after connection to remote fax machine has been completed, (e) said server sets an audit privilege of the fax and places a copy of fax detail information into a sending message auditing pool for audit purposes, (f) said server responds to sender that fax was sent successfully.

12. The process of claim 11 wherein a fax was not sent successfully, and comprising:

(a) an unsuccessful sending notice sent by server to the sender of the fax, (b) server requests the sender to correct any noted problem and to re-send the fax.

13. The process of claim 11 wherein there are several remote fax machine destination ID's consisting of different telephone numbers, and comprising:

(a) a fax sender at a local PC sends multiple destination ID's and fax data to the server, (b) said server temporarily stores the multiple destination ID's and the fax data, (c) said server sends a destination ID to a modem one at a time, (d) after successful connection to each destination, said server sends fax data to each fax receiver.

14. The process of claim 11 wherein one or more destination ID's are personal mail boxes, and comprising:

(a) the server successful sends fax data to one or more remote fax machines, (b) said server puts the fax data into a personal mail box for each local destination ID provided by the sender.

* * * * *